United States Patent

[11] 3,558,058

| [72] | Inventors | Dean J. Lennard<br>Cincinnati;<br>Donald Frederick Keck, Fairfield; Alfred Lingen, Cincinnati, Ohio |
|---|---|---|
| [21] | Appl. No. | 808,047 |
| [22] | Filed | Mar. 14, 1969 |
| [45] | Patented | Jan. 26, 1971 |
| [73] | Assignee | The United States of America as represented by the Secretary of the Air Force |

[54] THRUST VECTORABLE SUPERSONIC NOZZLE
10 Claims, 3 Drawing Figs.

[52] U.S. Cl. .................................................. 239/265.39,
60/230; 239/265.39
[51] Int. Cl. ....................................................... B64c 15/04
[50] Field of Search ............................................. 239/265.29,
265.33, 265.35, 265.39; 60/228, 229, 230

[56] References Cited
UNITED STATES PATENTS

| 2,799,989 | 7/1957 | Kappus | 239/265.35 |
| 2,928,238 | 3/1960 | Hawkins | 244/52 |
| 3,100,377 | 8/1963 | Kosin et al. | 239/265.35 |

*Primary Examiner*—Samuel Feinberg
*Attorneys*—Harry A. Herbert, Jr. and Arthur R. Parker ABSTRACT: A transonic/supersonic thrust vectorable jet engine nozzle having a variable geometry exhaust nozzle flap arrangement adjustable between horizontal and vertical flight modes of operation, and combined into a single component permitting the location of the exhaust nozzle and thrust diverter at the same location relative to the center of gravity of the aircraft.

PATENTED JAN 26 1971

INVENTORS
DEAN J. LENNARD
DONALD F. KECK
ALFRED LINGEN
BY Harry A. Herbert Jr
ATTORNEY
Arthur R. Parker
AGENT

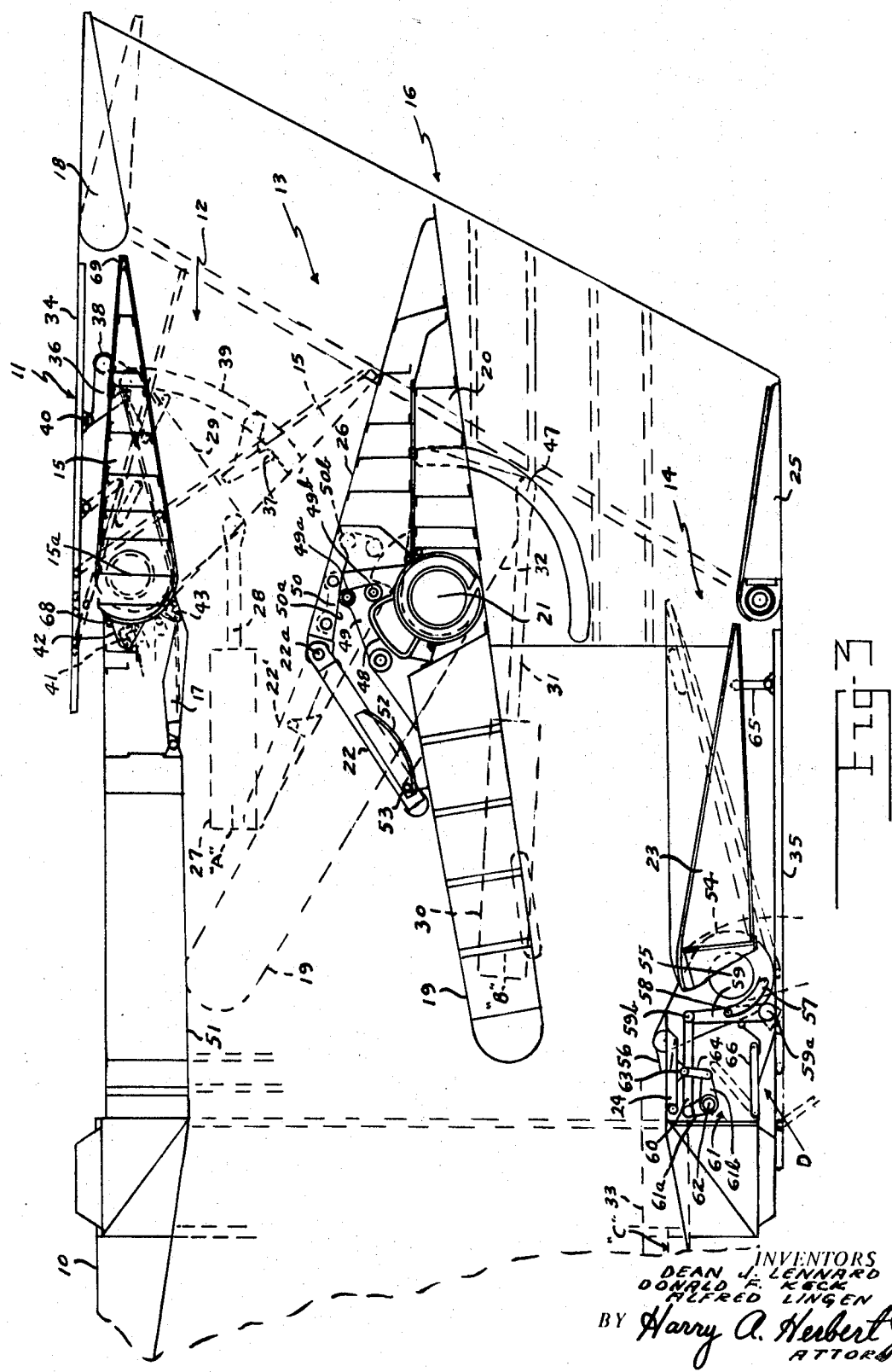

THRUST VECTORABLE SUPERSONIC NOZZLE

BACKGROUND OF THE INVENTION

This invention relates generally to the field of supersonic nozzles and, in particular, to the modulated type of thrust-vectoring STOL/VTOL nozzle applications combined into a single unit for facilitating both horizontal and vertical flight conditions.

With the development of both supersonic and V/STOL types of aircraft, the obvious application of both horizontal and vertical modes of operation in the same flight vehicle, or airborne weapons system, to thereby create an improved flight capability of much greater flexibility and application has inherently involved the development of improved forms of thrust-vectoring systems. In addition, the further development of supersonic vehicles capable of performing more complex missions involving a wide range of flight operational modes has likewise dictated the general need for an improved high performance, variable geometry jet exhaust nozzle. In particular, such a nozzle should be equipped with some means for diverting the jet exhaust flow from horizontal to vertical flight modes. The latter requirement has led to the improved nozzle of the present invention, which nozzle offers unique advantages that will become readily apparent hereinafter from the following summary and detailed description thereof.

SUMMARY OF THE INVENTION

A principle object of the present invention, therefore, resides in the development of an improved modulated thrust-vectoring nozzle that incorporates a novel variable geometry configuration which is designed to facilitate changes in horizontal flight modes from transonic to supersonic speed ranges.

Another object of the invention is in the utilization of an improved novel thrust-vectoring supersonic nozzle that is uniquely equipped with an improved system of diverter valve mechanism flaps that are adjustable between both transonic and supersonic configurations in the horizontal flight mode, and which are further adjustable to a diverted downward position to thereby facilitate jet operation to the vertical flight mode.

Other objects and advantages of the invention will appear from the following disclosure thereof in which:

BRIEF DESCRIPTION OF THE DRAWING

FIG. 3 represents a second, relatively enlarged and partially broken away view of the exhaust nozzle jet engine installation of FIG. 1, showing details of the adjustment mechanism used to control operation of the overall improved flap mechanisms of the present invention.

DESCRIPTION OF THE PREFERRED EMBODIMENT

Figure 1:
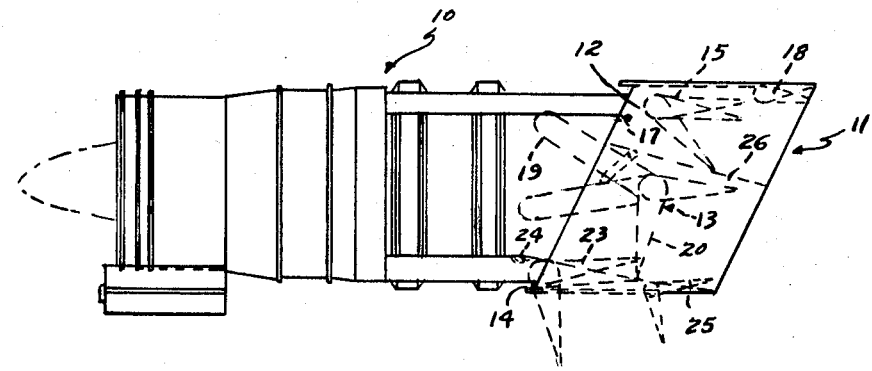
FIG. 1 represents an overall turbojet engine installation view, schematically illustrating the thrust vectorable nozzle and improved flap arrangement of the present invention shown mounted therein.

Referring to the drawing and in particular to FIG. 1 thereof, a type of jet engine installation in which the improved exhaust nozzle system and flap arrangement of the present invention may be incorporated is indicated generally at 10. The said exhaust nozzle portion thereof is indicated generally at 11 as including an upper nozzle system at 12, a centerbody system at 13, and a lower nozzle system at 14. As seen more particularly in FIG. 2, upper nozzle system 12 further comprises an upper primary, relatively small flap 17, a relatively enlarged flap 15, and an intermediate-size flap at 18 which is positioned at the nozzle exhaust opening indicated generally at 16. The said flaps 15 and 17 are interconnected for operation in a specific manner and for a purpose to be explained hereinafter in connection with FIG. 3.

The previously noted centerbody system 13 includes the front center flap 19 and the rear center flap 20, which flaps 19, 20 may be interconnected, also as illustrated in FIG. 3, and rotated about a common pivot, indicated at the reference numeral 21 for a purpose to be hereinafter explained in detail. In addition, the aforesaid centerbody system 13 is further associated with or incorporates a main, centerbody fixed support structure 26 which may be supported in rigid relation to, or form an integral part of, the exhaust nozzle portion of the jet engine assembly 10. Another relatively short flap 22 is pivoted to said support structure 26 at the pivot 22a, and is utilized for a purpose to be further explained in connection with the operation of the instant invention.

The aforementioned lower nozzle system 14 comprises a lower primary, relatively small flap 24, a relatively enlarged flap 23, and an intermediate-size lower body flap 25 likewise positioned at the exhaust opening 16, and which is separated from the previously noted upper body flap 18 by a distance approximating the overall width of the nozzle exhaust opening, and which further operates in concert therewith.

Figure 2:
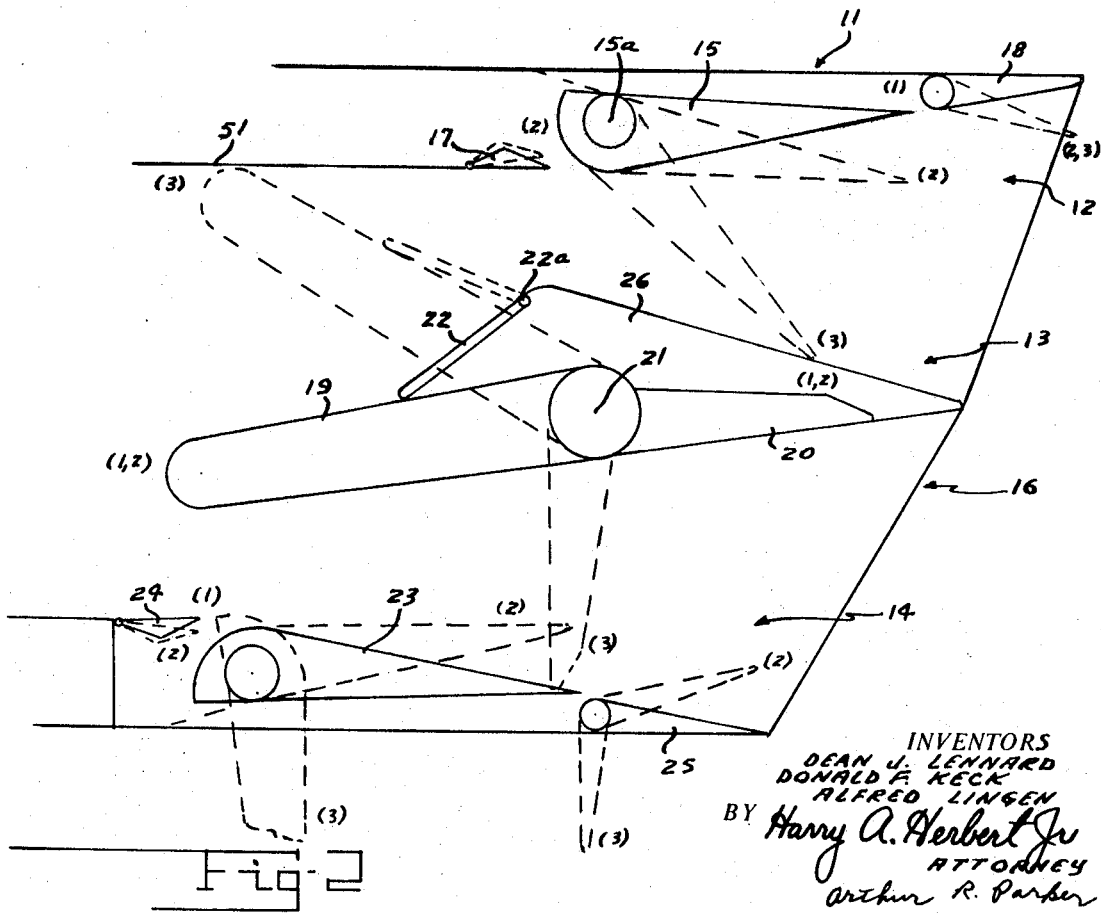
FIG. 2 is a relatively enlarged schematic view, more clearly depicting the inventive thrust vectorable nozzle and improved flap arrangement of FIG. 1.

The foregoing uniquely arranged upper, center and lower flap systems, all of which extend completely across the entire width of the exhaust nozzle to thereby provide control of the gas flow therethrough from between the horizontal and vertical flight modes, actually form the present two-dimensional thrust-vectoring nozzle 11 into two parallel nozzle portions, as is clearly seen in either FIG. 1, 2 or 3. Moreover, a total of three actuation systems are required, in the preferred embodiment to operate the flaps 15, 20 and 23 between their horizontal and vertical modes. The actuation system for the upper body flap 15 may consist of a pair of actuators, one of which is depicted in phantom at the reference numeral 27 (See FIG. 3). The other actuator (not shown) would be positioned in operative relation near the opposite pivot for the flap 15. Also shown in phantom are the actuator-interconnecting arm 28 and the flap-operating lever 29, the latter being directly mounted to the flap 15. There are actually a pair of actuator-interconnecting arms, such as at 28, and levers, as at 29, which may be simultaneously operated at, or adjacent each pivot end of the said flaps 15 to thereby adjust the latter to its various operating positions. These actuators, interconnecting arms, and operating levers may be located adjacent to the opposite sides of the main nozzle structure and, in this manner, be positioned outside the main gas stream flow path.

Similarly, the centerbody system rear center flap 20 is moved to its various positions about the pivot 21 by means of a second actuation system that includes a second or centrally disposed actuator indicated in phantom at 30, which actuator 30 also includes the actuator-interconnecting arm, and flap-operating lever, indicated in phantom respectively a 31 and 32. The latter element is rigidly affixed to the rear center flap 20 and, on operation of the said actuator 30 and interconnecting arm 31, the said flap 20 may be adjusted to one or the other of its alternate positions. The lower nozzle system flap 23 is likewise adjusted to various alternate positions by means of a third actuation system that includes a third actuator indicated at the reference numeral 33. The latter is interconnected with the said flap 23 by specific mechanism to be hereinafter described in detail in connection with the unique operation of the present invention.

As seen particularly in FIG. 3, the aforementioned upper nozzle system flap 15 is specifically interlinked with the previously noted relatively small, primary upper nozzle system flap 17. In this connection, during the actual operation thereof, two separate actuation systems may be incorporated in the present arrangement so that the flaps 15 and 17 may be operated independently of each other during the transition to and from the VTO, or vertical flight, mode of operation of the inventive nozzle. These two actuation systems, which are not separately shown since the specific details thereof are unimportant to the present invention, may be synchronized during the horizontal mode of operation. The previously mentioned main relatively enlarged lower nozzle system flap 23 is likewise specifically interlinked with the lower primary flap 24 to thereby provide, together with the interlinked upper nozzle system flaps 15 and 17, improved means for varying the nozzle throat area and nozzle exit area during the horizontal, or straight through mode of operation of the present nozzle. Again, two actuation systems may also be provided for independently operating the said flaps 23 and 24 during the transition to and from the VTO, or vertical flight mode of operation. The flaps 18 and 25, respectively, mounted at the upper and lower exhaust nozzle opening 16, are utilized to provide additional exit area capability to the present nozzle structure and, moreover, are pressure actuated to an equilibrium position by the gas flow resulting around these flaps. The latter flaps 18, 25 have the effect of reducing the length and resulting actuation loads required for operating the aforementioned upper and lower nozzle systems — flaps 15 and 23.

The previously described front and rear center flaps 19 and 20, respectively, of the centerbody system 13 are utilized to define one side of the flow path occurring during the thrust-vectoring mode of operation. The specific interlinking mechanism for the flaps 19 and 20, as well as that for the previously noted flaps 15 and 17, and flaps 23 and 24, will be hereinafter described in detail with particular reference to FIG. 3. The relatively short centerbody system flap, previously noted as being indicated at the reference numeral 22, is used to serve as a transition surface at the entry to the upper nozzle throat and it is interlinked with the front and center flaps 19 and 20.

Movably mounted panels, including an upper nozzle system panel at 34 and a lower nozzle system panel at 35, are respectively pivotably mounted to the upper and lower nozzle system—flaps 15 and 23 to thereby provide a continuous external flow surface during high Mach conditions of flow. Both of these panels are pivotally mounted to the flaps 15 and 23, respectively, as is clearly seen in FIG. 3, for both pivotal and translational movement between both extended and flush conditions relative to the surfaces of the said flaps 15 and 23 to thereby produce a desired boattail surface during transonic conditions of flow. Modulation of the said flaps 15 and 23 provides for the entire nozzle geometry variation required for horizontal or straight through operation, except for the condition of lightoff. For the latter condition of operation, the front centerbody flap 19 is moved in the specific manner to be hereinafter described in detail to thus provide the relatively large nozzle throat area required.

Again referring to FIG. 3, it is clearly seen that when it is desired to adjust the position of the upper nozzle system flap 15, the actuator indicated in phantom at 27, and which may be generally pivotally mounted about the pivot indicated at A, is operated and controlled by an exhaust nozzle control system (not shown) to thereby pivot or adjust the said flap 15 around its pivot at 15a downwardly to the desired position of adjustment. In this regard, its transonic flight mode position is indicated in phantom at the location thereof marked (2), whereas, its high Mach number position is illustrated in phantom at (3). As the said flap 15 is so adjusted, an upper nozzle system, first cam member at 36, which is pivotally mounted to the upper flap 15 nearer the downstream end thereof at the pivot 37, incorporates a cam roller at 38 which rides or engages within a relatively elongated and arcuate, upper slot 39. Since said cam member 36 is also pivoted to the upper panel 34, as at 40, the said panel 34 is moved or relocated to appropriate positions relative to the upper surface of the flap 15, such as is indicated, for example, in phantom at 15'. Another cam slot is incorporated, as indicated at 41, in a second cam 42 which is also mounted to the flap 15 at a position thereof on the opposite side of the flap pivot 15a remote from said first cam member 36. This slot 41 engages a cam follower 43 mounted on the forward end of the primary flap 17, thereby interlinking the latter flap to the aforesaid flap 15. Thus, as the said flap 15 is repositioned to one or the other of its alternate modes of operation, the flap 17 is also simultaneously repositioned by virtue of the above-described interlinking mechanism.

Rear center flap 20 of the previously described centerbody system 13 is positioned to one or the other of its two alternate positions by means of the previously specified second actuator 30, which may likewise by pivotally mounted at the pivot marked at B. The actuator 30, which may also be controlled by an exhaust nozzle control system (not shown), as in the case of the first actuator 27, likewise incorporates an actuator-interconnecting arm 31 which is pivotally engaged at the pivot 45 to the flap-operating lever shown in phantom at the reference numeral 32. The said flap-operating lever 32 is rigidly affixed with the aforesaid flap 20 and is mounted for rotation therewith by the actuation of the said arm 31 about the center pivot at 21. As the flap 20 rotates about said pivot 21, a third cam member, shown at 48 and which forms a part of the flap 20, forces simultaneous rotation of the front center flap 19. This latter rotational action is effected by the engagement of the said cam member 48 with a cam follower indicated generally at 49. Said cam follower 49, which incorporates rollers 49a and 49b, also engages with, and bears against, a fixed cam 50, which cam 50 is affixed to the previously noted center fixed supporting structure 26. The said cam 50 further incorporates an arcuate-shaped cam surface at 50a against which the roller 49a of the cam follower 49 initially bears during the initial period of rotation of the said flap 20. After the latter has been rotated by the actuator 30 to an approximately 30° displaced position, the front center flap 19, which is rotated by the said rear center flap 20 by the above-described engagement between the cam follower 49 affixed on the said flap 20 and the cam surface 50a affixed to the supporting structure 26, engages with and seals against the upper nozzle passage wall 51. At that point, a change in the contour (note reference numeral 50b) in the cam surface 50a has permitted the cam follower roller 49a to be displaced vertically upwardly into the complementary recessed cam surface wall portion or changed contour indicated at 50b. In this manner, the flap 19 is thereby locked in position and is held in place by the constant radius contour of the cam surface 50a. At the same time, the rear center flap 20 is released for further rotation.

After the above-described locking operation of the front center flap 19 against the upper nozzle passage wall 51, the rear center flap 20 continues to rotate further downwardly, while leaving the said flap 19 in its above-described locked position. At the same time that the flap 19 is rotated by the action of the flap 20, still another cam member indicated at 52 as being rigidly affixed to the relative short, centerbody flap 22, engages with still another cam follower indicated at 53 and which is rigidly mounted to upper surface of the flap 19. With this arrangement, the said flap 22 is automatically repositioned by the movement of the flap 19 to a substantially flush condition relative thereto as is indicated in phantom at 22' for the upper locked position of the said flap 19.

The previously specified third actuator 33, which may be pivoted about the pivot marked at C, is concurrently, with the aforementioned operation of the flaps 15 and 17, and 19 and 20, being operated to thereby reposition the lower nozzle system flap 23. This repositioning is effected by means of the main actuating link shown in phantom at 54 which is rigidly interconnected at its inner end with the center pivot means of the flap 23, as is generally indicated at 55. Interconnected with the outer end of said main actuating link 54 is the actuator-operating arm 56 which is controlled by operation of the third actuator 33. A cam slot, which is incorporated as indicated at 57 in a portion of the flap 23, engages in a cam follower 58 which, in turn, is positioned on an intermediate link indicated at 59. The latter element is pivotally mounted at its lower end to the pivot indicated at 59a and, at its other end, it is freely pivoted at the pivot 59b to one end of a second relatively elongated, main interconnecting link 60 which is, in turn, pivoted at its other end to the outer end of a bellcrank assembly, indicated generally at 61 and which is fixedly pivoted at 62. The latter consists of one bellcrank arm member 61a to the upper end of which is pivoted the previously mentioned link 60, and a second bellcrank arm member 61b. Interconnected between the outer end of the arm member 61b and a bracket 63 fixed to the primary lower flap 24 of the lower nozzle assembly is pivotally mounted a relatively short interconnecting link at 64. Thus, with the foregoing arrangement, operation of the lower nozzle assembly flap 23 to one or the other of its alternate positions also effects simultaneous adjustment of the said flap 24 by means of the said interlinking mechanism extending therebetween.

The previously noted lower panel 35, which is mounted for pivoting movement by virtue of the pivotally mounted link at 65, is actually moved or pivoted when the flap 23 is operated in an upward direction in flush relation to the underside of the said flap 23. When transitioning of the present nozzle to the vertical thrust mode of operation, a separate actuator (not shown) is used to displace the said panel 35 between the alternate positions seen clearly in FIG. 3.

The foregoing cam and linkage systems described hereinabove are utilized to provide a variable nozzle geometry of novel and improved configuration and which uniquely ensures horizontal flight at both transonic and supersonic speed ranges. Thus, for example, the schematic view of the inventive flap arrangement illustrated in FIG. 2 shows the double-throat configuration formed by the solid line positions of the respective upper, center and lower nozzle systems, as has been previously indicated. In this regard, the supersonic horizontal flight mode configuration is depicted by the solid line positions of the respective flap systems, the transonic horizontal flight mode configuration is depicted by the dotted line positions marked (2), and, lastly, the diverted or VTO; that is, the vertical flight mode position is depicted by the dotted line positions marked (3).

The aforementioned double-throat configuration, which is depicted in the solid line flap positions shown in both FIGS. 2 and 3, exists up to an approximately 19° vector angle as the vectoring operation involving the various adjustments of the inventive flap arrangements is accomplished. At this point, the previously described pivotal movement of the upper flap 15 occurs and the previously described sealed condition is formed between the upper nozzle system flap 15 and the upper surface of the centerbody structure 26 (Note the dotted line position (3) in FIG. 2, for example). The latter operation thereby changes the previous double-throat configuration to a single-throat mode available to the gas flow. Thereafter, further thrust-vectoring is accomplished by the additional rotation of the respective flaps towards the 90° vector position. Thus, for example, if the high Mach number configuration is desired, the previously described, actuators 27, 30 and 33, respectively utilized for the upper centerbody and lower nozzle systems 12, 13 and 14, may be actuated to move or maintain the flaps 15, 19, 20 and 23 to their solid line positions marked at (1), as seen in FIG. 2, for example. If, on the other hand, transonic flaps is desired, the aforesaid flaps are moved or maintained in their positions marked (2). Note, the latter position for both high Mach number and transonic flight modes is the same for the centerbody front and rear flaps 19 and 20.

For transition to and from the VTO mode of operation, or, in other words, to the vertical flight conditions, the lower flap 23, for example, is actuated by the actuator 33 to its upper phantom line position marked (2) (Note FIG. 2) towards the front center flap 19 so that the throat of the lower nozzle portion is thereby moved in the aft or rear direction to the end of the said flap 23. This latter action increases the pressure on the underside of the flap 19 and thus reduces its loading. Concurrently with the above action, a small door may be used to seal off the engine compartment cooling air passage behind the lower flap 24 to thereby prevent any reversed flow. At the same time, the upper flap 15 is lowered by actuation of the actuator 27 to its transonic position (2) so that the throat in the upper nozzle portion moves aft to the end of said flap 15.

The rear center flap 20, which is linked to the front center flap 19 as hereinbefore described, is then pivoted to its lower position, by the actuation of the actuator 30, and, in this manner, simultaneously raises the aforesaid front center flap 19 to its previously described sealed position against the upper nozzle wall 46. This latter action seals off the upper nozzle to the flow, and the above-described upward movement of the center flap 19 results in an increase in the throat area of the lower nozzle portion. As a result, the upper flap 15 must continue to be lowered to thereby reduce the throat area in the upper portion. As these latter actions are performed, the thrust vector is changing slightly and the further continued change in thrust vector is accomplished by the further actuation of the flaps 15, 24 and 20 downwardly towards the vertical mode positions thereof, or, in other words, the dotted line positions marked (3) in FIG. 2. When the flap 15 is moved by its actuator 27 to a position in contact with the fixed centerbody structure 26, it acts to seal off the outer passage gas flow and all of the said flow is thereafter exhausted out through the lower nozzle portion now defined by the flaps 24 and 20 when the latter have been respectively moved to their initial alternate positions. At this time, the flap 19 has reached its extreme upward position in sealing contact against the upper nozzle wall 51 and the connecting link or, in other words, the previously described cam member 48 of the rear center flap 20, which is initially interconnected with the front center flap 19, is now automatically disengaged therefrom through the upward movement of the cam follower 49 formed on the flap 19 into the cam slot 50b formed in the cam member 50 affixed on the centerbody supporting structure 26. This latter action permits the lower surface of the said cam follower 49 to ride upwardly against and along the upper, constant radius surface formed on the cam member 48 of the rear center flap 20. Of course, the flap 19 is now locked in its upper position, as noted hereinbefore, and the flap 20 may thereafter continue to rotate further downwardly to its vertical position indicated in phantom at (3). The lower nozzle system flap 23 continues to be moved by its actuator 33, in concerted action with the above-described movement of the rear center flap 20, also to its vertical mode position indicated by the phantom lines marked (3). The nozzle throat in the aforesaid vertical mode position is located at the end of the flap 20. During the foregoing transition phase, the relatively small flap 25 of the lower nozzle system 14 is automatically moved to a minimum drag position marked in phantom at (3) by the gas flow loadings. For transition back to the horizontal mode of flight operation, the flap 25 assumes either the horizontal mode position marked in phantom at (1) or (2) depending on whether supersonic or transonic flight is selected.

To complete the operation of the flap arrangement of the present invention, as the previously described lower flap 23 is rotated upwardly to its phantom position marked (2) (See FIG. 2), the lower panel 35 is pivoted and moved rearwardly to a flush condition and, with its edge slightly overlapping the aft end of the flap 23. This panel 35 is moved by a separate actuator (not shown) when transitioning to the vertical thrust mode. However, the above-described pivotal movement thereof ensures a minimum base area at the aft end of the flap 23 and, in addition, movement of the lower panel 35 results in the uncovering of an intake opening for secondary air which is thereby permitted to flow past the pressure actuated door 66 (See arrow D in FIG. 3) into the nozzle aft of the throat. Since the said flap 23 is also interlinked with the primary flap 24, the latter is also simultaneously moved to its phantom line position to thereby cause an increase in the nozzle throat area to that required for transonic conditions. During the previously described diverted or VTO mode of operation, the aforesaid panel 35 is translated forwardly and downwardly by its own actuation system to thereby follow the flap 23 to its diverted position. However, the primary flap 23 remains in its horizontal position by virtue of the unique and specific design of the previously described cam and linkage mechanism interconnected therebetween. The seal at 67 and the previously noted door 66 combine to prevent any air leakage during the high Mach number and diverted modes of operation. Similar seals are provided elsewhere in the system, such as those indicated at 68 and 69 for the upper flap 15 to thereby reduce nozzle leakage during the various operational modes.

Although a preferred embodiment of the invention has been shown and described for purposes of exemplification, it is apparent that many modifications and changes may be made without departing from the true spirit or scope of the invention, as defined hereinafter in the accompanying claims.

We claim:

1. In a two-dimensional thrust vectorable supersonic nozzle; a centerbody structure initially positioned in centered relation within the exhaust nozzle portion and adapted to normally divide the nozzle exhaust gas flow into an upper and a lower path directing the exhausting gas products in a rearwardly direction representing the horizontally oriented flight mode of operation; an upper nozzle system adapted to form one nozzle wall portion and being separated from one side of said centerbody structure to thereby form an upper gas flow path in combination with said centerbody structure; a lower nozzle system adapted to form a second nozzle wall portion oppositely disposed from said first-named nozzle wall portion and being similarly separated from the opposite side of said centerbody structure to thereby form therewith a lower gas flow path; first actuating means operably associated with said upper and lower nozzle systems and adapted to respectively reposition said nozzle systems relatively inwardly simultaneously in an inward and an outwardly position of adjustment respectively representing the transonic and supersonic horizontal flight modes of operation; and second actuating means operably interconnected with said centerbody structure and said upper and lower nozzle systems and adapted to collectively readjust said centerbody structure and nozzle systems to a downwardly directed configuration representing the vertical flight mode of operation.

2. In a two-dimensional thrust vectorable supersonic nozzle as in claim 1, wherein said first-named actuating means incorporates a first and a second gas flow path-diverting mechanism respectively comprising said upper and lower nozzle systems and each being adjustable between a first, horizontally oriented position for respectively exhausting the separated gas flow rearwardly along the said upper and lower gas flow paths representing the horizontal mode of transonic and/or supersonic flight, and a second vertically oriented position of adjustment for directing the separate exhausting gas flows into a single, combined gas flow directed substantially along a single gas flow path disposed at an approximately 90° angle to the horizontal mode of operation.

3. In a two-dimensional thrust vectorable supersonic nozzle as in claim 1, wherein said second-named actuating means comprises a fixed centerbody structural element adapted to form part of the nozzle structure, and a centerbody flap mechanism movably mounted on, and adjustable relative to said fixed element for repositioning between its normally centered position forming the said two separate and horizontally directed gas flow paths to a second position of adjustment facilitating the conversion and direction of the said separate gas flows into the said single combined gas flow path diverted into the downwardly and vertically oriented flight mode configuration.

4. In a two-dimensional thrust vectorable supersonic nozzle as in claim 2, wherein said first-named gas flow path-diverting mechanism comprises an upper primary flap device positioned in, and forming part of the upper nozzle system at a relatively upstream location therein and operative on the main gas flow; and a second upper nozzle system flap device positioned immediately downstream of said primary flap device and formed in tandem relation therewith and thereby adapted to be cojointly operated during the transition phase of flight operation; and said second gas flow path-diverting mechanism comprising a similar lower primary flap device positioned in, and forming part of the lower nozzle system and located at an upstream position directly opposite of said upper primary flap device; and further having a second flap device positioned immediately downstream thereof and similarly corresponding to that of said upper nozzle system and likewise acting in tandem relation both with said lower primary flap device and with said upper nozzle system gas flow path-diverting mechanism for thereby collectively moving inwardly and outwardly during the transition phase between the transonic and supersonic flight modes.

5. In a two-dimensional thrust vectorable supersonic nozzle as in claim 4, and a pair of pressure-actuated and oppositely positioned outermost flaps located at the extreme exhaust downstream end portion opening of said nozzle for thereby providing added exit area capability to said nozzle, and simultaneously and automatically adapted to streamline with the gas flow being exhausted therethrough to thereby reduce the normal length and actuation loads required for repositioning the second-named flap devices for both upper and lower nozzle systems.

6. In a two-dimensional thrust vectorable supersonic nozzle as in claim 1, wherein said centerbody structure further comprises a fixed body element forming part of the nozzle structure, and a pair of flap elements pivotally mounted at the same pivot to said fixed body element and respectively movable in joint action with each other and between a centered relation in the said nozzle to thereby assist in changing the previously separate upper and lower gas flows being exhausted rearwardly during the horizontal flight mode into a single combined gas flow directed substantially vertically downwardly for exhausting out of an opening provided by the further adjustment of said lower nozzle system in the nozzle surface associated therewith.

7. In a two-dimensional thrust vectorable supersonic nozzle as in claim 6, said pair of centerbody flap elements further comprising a first, downstream flap interconnected with a second, upstream flap and releasably affixed for simultaneous movement therewith and thereby readjust the combined positions thereof downwardly and upwardly in respective contact with the upper nozzle wall structure to thereby seal the said upper nozzle system flow path against further substantially horizontal gas flow therethrough and redirect the said flow downwardly in the vertical flight mode configuration.

8. In a two-dimensional thrust vectorable supersonic nozzle as in claim 7, wherein said fixed centerbody element incorporates a first cam element initially engaging with a cam follower fixed to said centerbody upstream flap; and said centerbody downstream flap further incorporating a second cam engaging with and moving said cam follower and the said upstream flap affixed thereto in contact with said first-named cam until reaching a latched position therewithin and in sealing contact with the upper nozzle system wall surface to thereby close off the upper gas flow path; said centerbody downstream flap thereafter disengaging from said upstream flap and continuing to rotate to a substantially vertical position closing off the lower nozzle assembly gas flow path in preparation for transitioning the nozzle operation from the horizontal to the vertical flight mode by defining one side of the combined flow path formed by the subsequent adjustment of said upper and lower nozzle system flaps.

9. In a two-dimensional thrust vectorable supersonic nozzle as in claim 8, and a third flap device pivoted at one end thereof to said centerbody fixed body element and interconnected at its other end by cam means with said second, upstream centerbody flap to thereby rotate upwardly with said second upstream flap, on movement of the latter by operation of said first-named centerbody flap, to thereby provide a relatively smooth transition surface at the entry of the throat portion of said upper nozzle system.

10. In a two-dimensional thrust vectorable supersonic nozzle as in claim 9, wherein the said downstream-positioned lower nozzle system flap is interconnected with a third actuating means adapted to readjust said flap and automatically repositioning said lower primary flap concurrently with the repositioning of said upper nozzle system tandem-mounted flaps and said centerbody system to thereby orient the said nozzle into its vertical flight mode configuration; said upper and lower nozzle assemblies each having a movably mounted and relatively elongated panel member pivotally mounted thereto for providing a continuous external flow surface during high Mach conditions and being further adapted to fold down in flush relation with the downstream upper and lower flaps corresponding thereto during transonic conditions.